US008869259B1

(12) United States Patent
Udupa et al.

(10) Patent No.: US 8,869,259 B1
(45) Date of Patent: Oct. 21, 2014

(54) CLOUD BASED INSPECTION OF SECURE CONTENT AVOIDING MAN-IN-THE-MIDDLE ATTACKS

(75) Inventors: Sivaprasad Udupa, San Jose, CA (US); Narinder Paul, Sunnyvale, CA (US); Jose Raphel, Austin, TX (US); Kailash Kailash, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 290 days.

(21) Appl. No.: 13/111,753

(22) Filed: May 19, 2011

(51) Int. Cl.
  *H04L 29/06* (2006.01)
(52) U.S. Cl.
  USPC ............................................................ 726/10
(58) Field of Classification Search
  CPC ............ H04L 63/0823; H04L 2209/76; H04L 9/3263
  USPC .......................................................... 726/10
  See application file for complete search history.

(56) References Cited

U.S. PATENT DOCUMENTS

| | | | |
|---|---|---|---|
| 6,807,577 B1 * | 10/2004 | Gillespie et al. ............... | 709/227 |
| 6,931,532 B1 * | 8/2005 | Davis et al. .................... | 713/167 |
| 6,978,376 B2 * | 12/2005 | Giroux et al. .................. | 713/189 |
| 6,990,583 B2 * | 1/2006 | Matsuyama et al. ........... | 713/175 |
| 6,996,841 B2 * | 2/2006 | Kadyk et al. ................... | 726/12 |
| 7,877,785 B2 * | 1/2011 | Selignan ........................... | 726/3 |
| 8,214,635 B2 * | 7/2012 | Wang et al. ..................... | 713/156 |
| 2007/0174908 A1 * | 7/2007 | Eshun et al. ..................... | 726/12 |
| 2009/0193113 A1 * | 7/2009 | Lunde ............................. | 709/224 |
| 2011/0154026 A1 * | 6/2011 | Edstrom et al. ................ | 713/158 |

OTHER PUBLICATIONS

An Entity-centric Approach for Privacy and Identity Management in Cloud Computing; Pelin Angin et al.; 2010.*

* cited by examiner

*Primary Examiner* — Kambiz Zand
*Assistant Examiner* — James Turchen
(74) *Attorney, Agent, or Firm* — Clements Bernard PLLC; Lawrence A. Baratta, Jr.; Christopher L. Bernard

(57) ABSTRACT

A cloud based system that facilitates inspection of secure content and inexpensively detects the presence of a Man-in-the-Middle attack in a client-server communication is disclosed. Through inspection of the server certificate, no Man-in-the-Middle attack between server and the system is ensured; through inspection and designation of the client certificate, absence of a Man-in-the-Middle attack between the cloud based system and the client is ensured. In this way, the cloud based system can perform its usual policy enforcement functions with respect to secure content while avoiding Man-in-the-Middle attacks.

18 Claims, 3 Drawing Sheets

CLOUD BASED INSPECTION OF SECURE CONTENT AVOIDING MAN-IN-THE-MIDDLE ATTACKS

I. BACKGROUND

The present invention relates to computerized systems, software and methods for use by a cloud based service to inspect secure content while avoiding a man-in-the-middle attack.

There are several problem associated with cloud based service inspection of content communicated via a secure channel, such as using secure socket layer traffic. These problems include: (i) problems that are related to secure content inspection, (ii) problems related to malicious proxies, and (iii) problems that are related to client certificate deployment.

Content Inspection Problems

In order to enforce security policies, the content of the web transactions must be inspected. This is conventionally done using inspection gateways at the enterprise/ISP perimeter. When cloud based services are used for enforcing security policies, similar inspections must be done in the cloud based service nodes. However, cloud based inspection of SSL/TLS traffic can occur when only server certificate based authentication occurs but will break when a server requests client certificate based authentication.

In a situation where the option client certificate based authentication is not employed, a cloud based security service node (PN) intercepts an HTTPS communication by providing a server certificate for a requested domain signed by the PN. The PN dynamically creates and signs the server certificate, but with no malicious intent. The PN is an authorized certificate authority (CA). Browsers trust the certificate as long as the chain of trust, the sequence of signatories transitively reaches a root CA, is maintained. Hence the certificates provided by PN are acceptable by the browsers. The PN has thus split the SSL session into two, one between the intended server and the PN, and another between the client and the PN. It has split the server certificate into two, one maintained between intended server and the PN and another between the PN and client. The private key of the server certificate between the PN and client is held by the PN. The PN gets public key of the server certificate for the SSL session between the intended server and the PN. The PN can encrypt content in the server-PN session, it can decrypt content in the PN-client session. Hence, the PN can make the communication transparent and inspect the content.

Though the PN can transparently bridge the secure communication and inspect content in a server authenticated scenario, if the server requests a client certificate signed by its trusted CA, the PN cannot perform the above translation across the SSL connections. It can forward the request to the browser, obtain the client certificate, but cannot translate the certificate and sign it as the designated CA. Hence, the PN has to abort inspection of content for sessions that require a client certificate.

Client certificates are important security features used to authenticate a client to a server. When a web page is requested over SSL, it is the server that controls the handshake procedure that sets up the encrypted channel. If the server has been set up to expect client certificates then it will issue a request to the browser for a user certificate signed by one of the signing authorities that are recognized by the server. Only client certificates that would be recognized by the server are allowed to be returned by the browser, which means that sometimes the browser sends back nothing in response to a server's request for a client certificate, even if a number of certificates have been registered in the browser which are signed by various other certificate authorities. If more than one of the certificates in the browser store would be recognized by the server, the user is prompted for which one represents the identity that he would like to present to the server.

Trusted certificates are signed by a CA. A certificate contains information about the certificate owner, its public key and a signature of the CA. The CA signs a certificate by producing a message digest (e.g., 128 bit MD5 hash) of the certificate fields (except the signature field) and produces a digest value. The digest value is then encrypted using the CA's private key and is added as the signature. The CA's public keys are well known and the signature can be verified using the respective public key.

In the public key encryption, two key pairs, a private key and its corresponding public key are generated. The private key is kept secret and the public key is communicated to the receiving party. If information is encrypted using the private key, it can be decrypted only using the public key and vice versa. A typical process of certificate creation is explained below.

1. Key Generation: The individual requesting certification (the applicant, not the CA) generates key pairs of public and private keys.

2. Matching of Policy Information: The applicant packages the additional information necessary for the CA to issue the certificate (such as proof of identity, tax ID number, e-mail address, and so on). The precise definition of this information is up to the CA.

3. Sending of Public Keys and Information: The applicant sends the public keys and information (often encrypted using the CA's public key) to the CA.

4. Verification of Information: The CA applies whatever policy rules it requires in order to verify that the applicant should receive a certificate.

5. Certificate Creation: The CA creates a digital document with the appropriate information (public keys, expiration date, and other data) and signs it using the CA's private key.

6. Sending/Posting of Certificate: The CA may send the certificate to the applicant, or post it publicly as appropriate.

7. The certificate is loaded onto an individual's computer.

Thus, though a certificate may be possessed by a different person other than its owner, only the owner has its private key. For example, a client send certificate may be owned by an intermediate MitM, but it cannot create a certificate verify message that uses the private key to encrypt the hash sum of the handshake messages exchanged. A client certificate is returned in response to a client certificate request.

The structure of client certificate request message is a follows:

```
enum {
rsa_sign(1), dss_sign(2), rsa_fixed_dh(3), dss_fixed_dh
   (4), rsa_ephemeral_dh_RESERVED(5), dss_ephemer-
   al_dh_RESERVED(6),    fortezza_dms_RESERVED
   (20),
(255)
} ClientCertificateType;
opaque DistinguishedName<1 ... 2^16-1>;
struct {
ClientCertificateType certificate_types<1 ... 2^8-1>;
DistinguishedName certificate_authorities<0 ... 2^16-1>;
} CertificateRequest;
``` certificate_types

This field is a list of the types of certificates requested, sorted in order of the server's preference.

certificate_authorities

A list of the distinguished names of acceptable certificate authorities. These distinguished names may specify a desired distinguished name for a root CA or for a subordinate CA; thus, this message can be used to describe both known roots and a desired authorization space. If the certificate_authorities list is empty then the client MAY send any certificate of the appropriate ClientCertificateType, unless there is some external arrangement to the contrary.

ClientCertificateType values are divided into three groups:
1. Values from 0 (zero) through 63 decimal (0x3F) inclusive are reserved for IETF Standards Track protocols.
2. Values from 64 decimal (0x40) through 223 decimal (0xDF) inclusive are reserved for assignment for non-Standards Track methods.
3. Values from 224 decimal (0xE0) through 255 decimal (0xFF) inclusive are reserved for private use.

Thus, the certificate request will specify a certificate type (the encryption method used in the certificate) and optionally, one or more distinguished names of signatories. Signatory list may contain a root CA or a subordinate CA.

It is a severe drawback of the existing cloud based security services that content policies cannot be applied when used with client certificate mechanism. The problem may be rectified by proxying client certificates and ensuring that the proxied client certificates are acceptable to the server. An alternative is to bypass inspection of secure content when a client certificate is involved. But, this alternative defeats the cloud based service policy constraints intended to be applied, and moreover, a malicious proxy can assert the need of a client certificate in every SSL session establishment and thereby force the inspection system to bypass all of the secure communication.

Malicious Proxy Problems

A second set of problems are related to malicious proxies. A malicious proxy can alter the server certificate and still make it acceptable to browsers by changing the certificate keys and signing it using proxy's signing keys. It falsely certifies the key of the server to be one possessed by the proxy. Such alterations cannot be detected by the browsers. It is required to verify the server certificates itself to ensure that there is no Man-in-the-Middle. For example, Bank of America certificates may be signed by Verisign. A browser, however cannot distinguish a Bank of America server certificate signed by Verisign from one signed by GoDaddy, another CA, as long as the chain of trust reaches a root CA. Incorporating all server certificates into the browsers is resource intensive and also provide a new area for malicious activity by changing the installed server certificates.

A malicious proxy that intercepts the communication between a server and the PN can fictitiously insert client certificate request even for domains that require no authentication and can remove the client certificate at its end. Most internet SSL sites require no authentication. Thus, a SSL MitM can attack the cloud based security services by making the cloud service believe that the server requires a client certificate, and thereby bypassing all SSL transactions uninspected. This is a serious security limitation against performing data leakage inspection and other content inspections to protect the client.

Client Certificate Deployment Problems

Malicious SSL MitM's may be prevented through the use of client certificates. However, client certificate mechanism defeats SSL inspection. Existing client certificate mechanisms also have many other drawbacks. The third set of problems is related to the deployment of the existing client certificate mechanism.

1. Client certificates are numerous and are expensive to manage by the server. For example, Bank of America may have millions of customers, each using a signed certificate. The Bank of America customer base changes rapidly as new accounts are opened and existing accounts are closed. This gives rise to the creation of new certificates, revocation of existing ones, etc.
2. Mergers and acquisitions may enforce re-issue of the certificate by a new signatory.
3. Secure generation, signing and installation of certificates are a complex process that requires huge resources. A client has to maintain multiple certificates, each one for a particular service. If two or more of the services are signed by the same CA, then the client has to remember which certificate to provide to the server. The request for a certificate will only indicate a signatory.

One approach to solve the problem is to store the client certificates in the cloud based inspection service and let the client use a single certificate. However, this amounts to storing a number of private keys with the proxy. If the user has subscription to "M" services, typically a small number 10, and a service has "N" users, typically a few million users, then M×N certificates need to be serviced by the proxies.

Another approach to solve the problem is to allow an enterprise to sign its certificates and to let the cloud based security service node (PN) issue a single signing certificate to the enterprise. Enterprises may allow further signing hierarchy such as departments (HR, Sales, Engineering, Marketing, Guest, etc) and issue signed client certificates. Since the signing chain must reach the PN, its authenticity can be verified using the PN.

There are two objectives in the use of a client certificate. The first objective of the client certificate is to ensure confidentiality, that there is no Man-in-the-Middle between the communicating peers. A second objective is to ensure that the certificate holder is indeed the service holder; certificate serving as a second factor in a multi-factor authentication.

The first objective is achieved by verifying that the certificate is signed by the designated signatory. The second objective is achieved by encoding distinguished names such as the user id into the certificate fields and also verifying the client's ability to generate a correct certificate verify request. A "certificate verify" request ensures that the client has the private key of the certificate.

Both these objectives are broken when SSL/TLS traffic is inspected for data leakage or other violations in cloud based security service nodes. There is a need to rectify the limitation while providing traffic inspection ability to detect policy violation. This application focuses on methods that reestablish the confidentiality and authentication objectives of the client certificates while allowing content inspection of secure traffic.

II. SUMMARY

The present application discloses computerized methods, systems, and software products that allow inspection of secure content by the cloud service while avoiding a man-in-the-middle attack. These approaches in various implementations involve verifying the security of connection between the client device and the cloud service, verifying the security of the connection between the cloud service and the server, and the cloud service inspecting secure content from the server prior to forwarding the secure content to the client device.

The foregoing general description and the following detailed description are exemplary and explanatory only and do not restrict the claims directed to the invention. The accompanying drawings, which are incorporated in and constitute a part of this specification, illustrate one or more embodiments of the invention and together with the description, serve to explain the principles of the disclosed technology.

III. BRIEF DESCRIPTION OF THE DRAWINGS

IV. DETAILED DESCRIPTION

Figure 1:
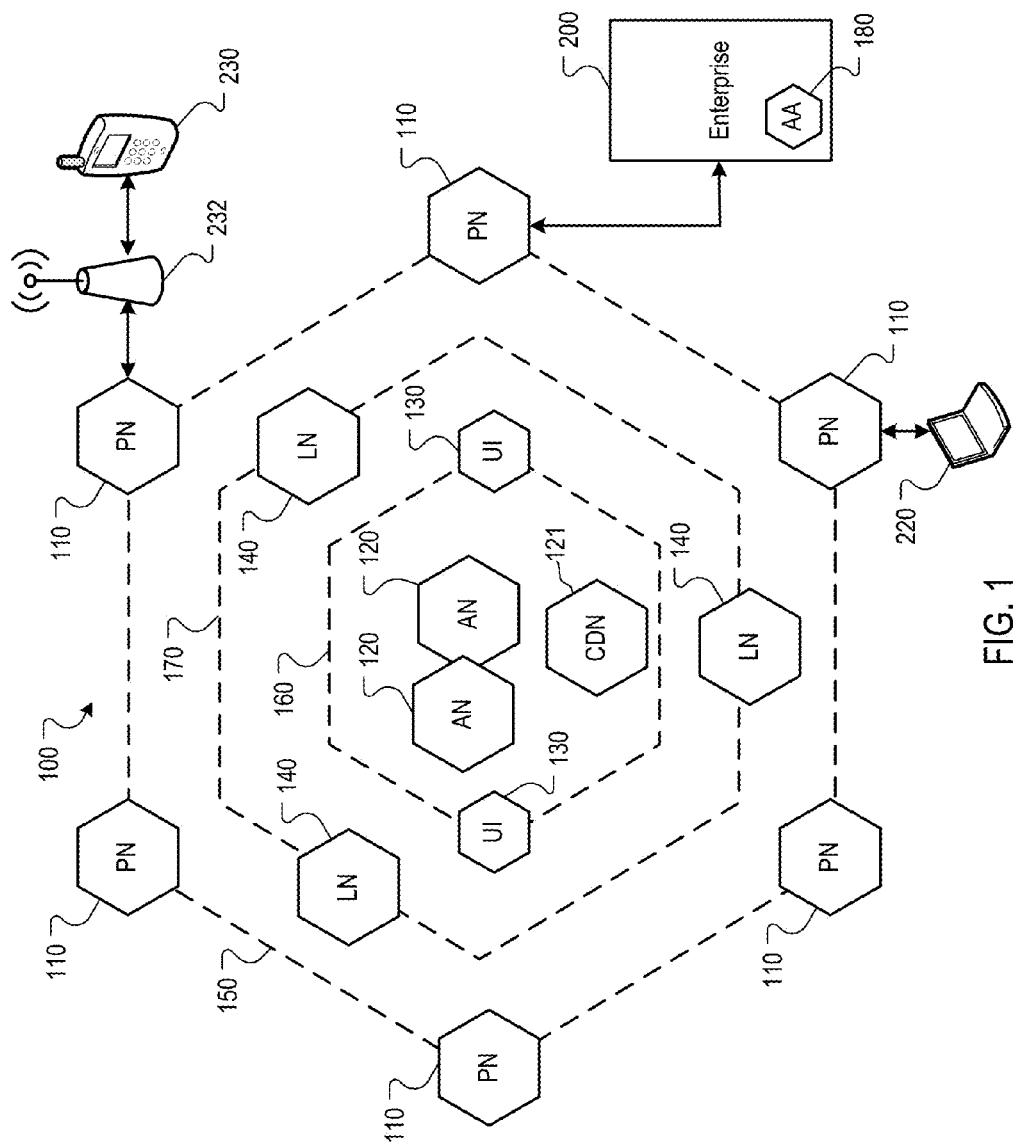
FIG. 1 is a block diagram of a cloud security system.
Figure 2:
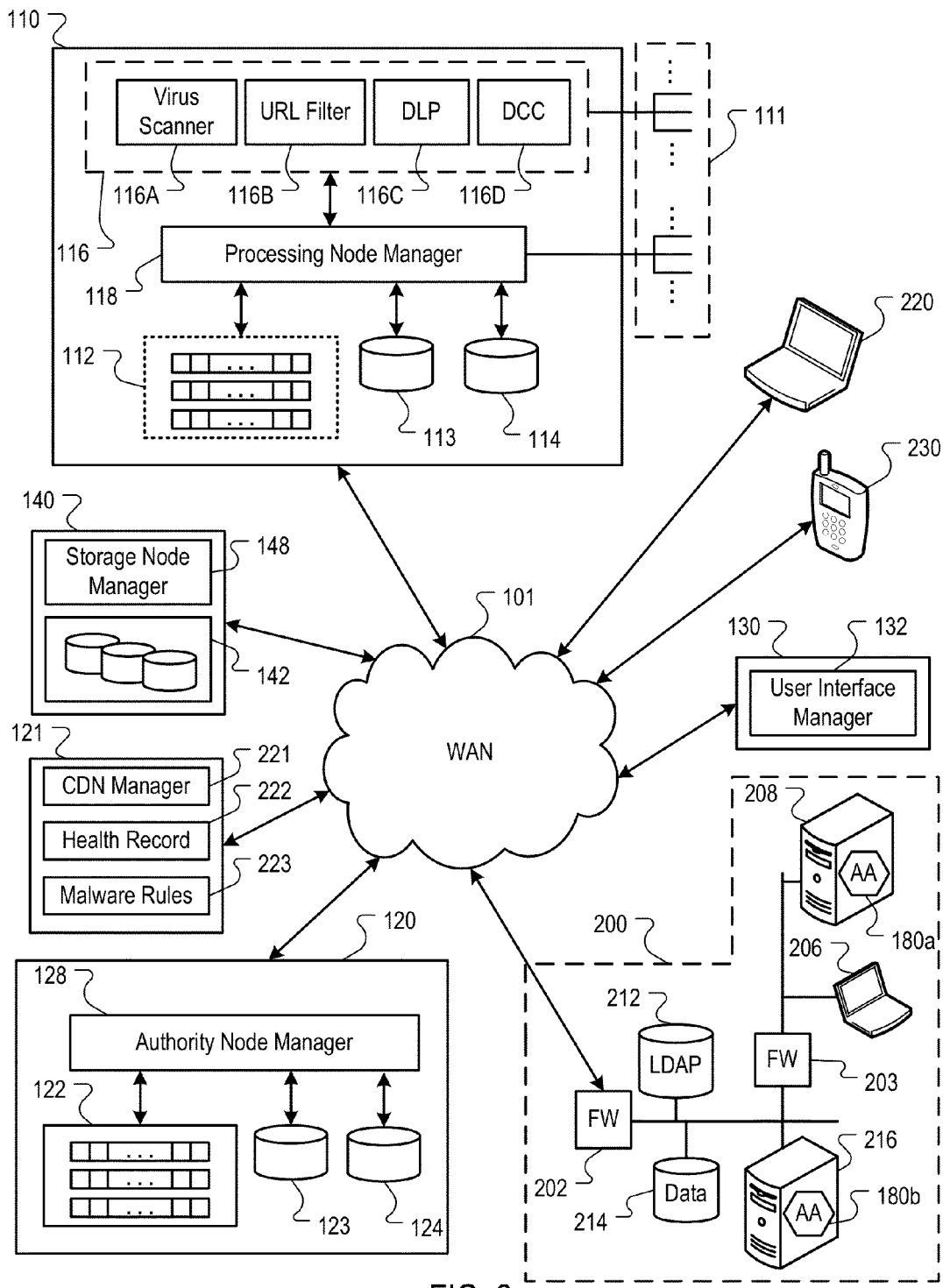
FIG. 2 is a block diagram of the system of FIG. 1 in which the components of FIG. 1 are illustrated in more detail.

This application refers in detail below to the exemplary embodiments of cloud-service systems, methods and software for inspecting secure content while avoiding man-in-the-middle attacks. Wherever possible, the application uses the same reference numbers throughout the drawings to refer to the same or similar items.

Cloud based security (for example ZScaler Cloud™) is an emerging framework to deploy and upgrade security solutions for multiple service subscribers without causing the upgrade delay found in conventional premise security appliances and applications. Cloud based security is the common core of any cloud based service offering. Security services such as URL and content based message filtering, Malware Scanning, Data Leakage Protection, may be performed by the use of an access gateway. Additional specific services may be offered through appropriate configuration of policies available in the gateway. Discussed herein are approaches used to inspect secure content while avoiding man-in-the-middle attacks.

As used herein, the terms "client", "server", "cloud based security service", "cloud based service", "internet service" and "user" describe client/server communication through an intercepting proxy. The user communicates to the server from a client machine by directing traffic through the intercepting proxy. The proxy performs the "cloud based security service," the server offers either a cloud based service or an internet service.

The following terms will have the following definitions throughout this specification and the claims that follow.

MitM—Man-in-the-Middle, a proxy used to intercept the communication transparently without the knowledge of the client or server.

SSL MitM—A MitM proxy that intercepts secure communication by dynamically generating certificates for the domains that are being accessed. The new certificates are constructed from the server certificate and signed using a certificate chain present in the proxy's signing certificate. Browsers look for validating the chain of trust by checking whether the certificate chain transitively reaches the root CA. Root CA certificates are stored in operating system's trust store.

MitB—Man-in-the-Browser, a Trojan that can construct and divert web transactions at the authenticated user's level. The traffic is indistinguishable from the traffic generated by the user.

Private Enterprise Cloud—Enterprise's services with a set of virtualized servers in their data centers. Each server's utilization is improved by running multiple applications in a virtualized environment.

Public Service Cloud—A cloud based service such as SalesForce.com which is offered in a multi-tenant environment. Data and configuration information lies in the servers of the service.

Credentials—Tokens used to validate a user. User name, Password are common credentials. Client certificates, secure tokens, client IP address, IMEI are also examples.

Multi-factor Authentication—Authentication using multiple credentials drawn from factors such as (i) What you know, (ii) What you have and (iii) What you are. When multiple factors are used, the authentication is called strong authentication. Example, authentication using client certificate and user name, password combination.

On-Premise-Security—The network of security appliances, such as Firewalls, Security Gateways, Content Inspection engines, Malware Scanners, Authentication Servers, Policy Servers, VPN gateways, Policy Routers, etc that protect the enterprise from external threats and provides access to external resources in a role based form.

Client Certificate—A digital document that has client identity, a public key and a signature by a certificate authority. The binding between the public key and client identity is certified by the signature of the certificate authority. Receivers of the certificate (Eg. Server, Proxy) can verify the certificate to establish that the certificate holder has the associated identity and test to determine whether the certificate holder is the holder of its private key.

Security Service Node or Processing Node (PN)—A network node which enforces security and offered as a service in the cloud. It authenticates the service user, inspects the traffic, both data and control traffic and enforces policies.

Cloud Service Node (CN)—A server that virtually or physically provides the service. For example, banking service node, SalesForce Service Node, Paypal service node etc. Here we intend services that are to be highly secured.

FIG. 1 is a block diagram of a cloud based security system 100. The system 100 can, for example, be implemented as an overlay network in a wide area network (WAN), such as the Internet. The system 100 includes content processing nodes 110 that detect and preclude the distribution of security and performance threats, e.g., malware, sent from or requested by an external system. Example external systems can include an enterprise 200, a computer device 220, and a mobile device 230, or other network and computing systems.

The term malware is used throughout the present disclosure to include any undesirable content that can pose a security risk or negatively impact the performance of a computing device, including, for instance, viruses, spyware, and spam.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector $D=[d1, d2, \ldots, dn]$ for a content item of one or more parts $C=[c1, c2, \ldots, cm]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part $C=[c1, c2, \ldots, cm]$ of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can be implemented by push and pull distribution schemes described in more detail below.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

The system 100 also includes a configuration distribution node (CDN) 121 that coordinates each of the processing nodes 110 and storage nodes 140. The CDN 121 can perform all of the functions of an authority node 120. According to some implementations, the CDN 121 can be an authority node 120. Thus, although illustrated as a separate component from the authority nodes 120, the CDN 121 may represent one such authority node 120. The CDN 121 can act as a master authority node by receiving data corresponding to system activity from each of the processing nodes 110 and storage nodes 140, which are each operable to forward the data to the CDN 121.

In some implementations thousands of system activities can be monitored at predefined intervals within each of the systems monitored by the processing nodes 110 and storage nodes 140. Data corresponding to at least some of the system activity is communicated from the processing nodes 110 and storage nodes 140 to the CDN 121. For instance, data corresponding to a few hundred system activities can be routinely communicated to the CDN. System activities can include operating system activity (e.g., disk I/O, File I/O, System Call), network events (e.g., packets received, packets sent, retransmissions, errors), and/or content inspection events (e.g., operation of anti-virus software, the occurrence or results of content inspection).

As described in greater detail below, the CDN 121 receives data corresponding to system activity from multiple networks during normal operation of the networks. The CDN 121 thus allows collection and monitoring of data from multiple, aggregated networks over a wide geographical distance. That data is stored and accessible by the CDN 121 for comparison to data collected corresponding to subsequent system activity. When the subsequent data falls outside of parameters based on the data representing normal operation of the networks, the CDN 121 can generate an alert.

An alert can be to an administrator associated with the system 100 or one or more of the networks, and can be an e-mail, instant message, or the like. An alert can also include corrective action to prevent activity that is causing generation of the data that does not represent the normal operation of the monitored networks.

Other application layer functions within the system 100 can be provided in the application layer, such as a user interface front-end 130, also referred to herein as view node. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in storage nodes 140, which serve as a data storage layer 170. Each storage node 140 can store data related to security operations and network traffic processed by the processing nodes 110 for each external system.

In some implementations, the storage node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or storage node 140 data can be further encrypted, e.g., so that only the enterprise (or user if a single user account) can have access to the storage node 140 data for its account. Other processes of anonymizing, obfuscating, or securing storage node 140 data can also be used.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, chose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise an access agent 180 can be configured to perform MPLS labeling.

In another transparent proxy mode example, a protected system, such as the enterprise 200, may identify a processing node 110 as a next hop router for communication with the external servers.

§2.3 Example CDN Architecture

The CDN 121 coordinates each of the processing nodes 110, and storage nodes 140. As described above, according to an implementation, the CDN 121 can represent an authority node 120. Thus, the CDN 121 can perform all of the functions of an authority node 120 and can receive data corresponding to system activity from each of the processing nodes 110 and storage nodes 140.

The CDN 121 includes a CDN manager 221 for managing the operations of the CDN. Because the CDN 121 can represent an authority node 120, in some implementations the CDN manager 221 may be implemented or be the same as the authority node manager 128. The CDN manager 221 can facilitate the collection and/or receipt of data corresponding to system activities from each of the processing nodes 110, storage nodes 140, and authority nodes 120. The data can be stored in a heath record 222. In implementations where the CDN 121 is an authority node, the health record 222 can exist within the authority node 120. According to some implementations, the CDN manager 221 can store data representing changes in system state within the health record 222. The health record 222 can, for instance, be implemented via one or more tables.

According to some implementations, the CDN manager 221 can collect data (e.g., sample data) during a sampling interval in which the network is operating under normal conditions. The sample data can be collected at sampling intervals that capture small changes in the network, such as at 1-10 samples per second for each system activity occurring at each node in the system. The sample data can be stored in the health record 222. According to some implementations the CDN manager can 221 use the sample data to generate and store one or more threshold values that indicate the range of possible activities that are considered normal.

For instance, for a particular system activity the CDN manager 221 can identify maximum or minimum threshold values from the sample data, where the threshold values representing the range of acceptable values for the system to be considered operating normally. Threshold values can be stored for each type of activity such that collection of subsequent data during system monitoring can be compared against the values by the CDN manager 221 to determine if the system is operating normally.

After the sampling interval is complete, the CDN manager 221 can collect data (e.g., observed data) to monitor the health of the network and to identify when malicious activity may be taking place. The observed data can be collected at intervals that capture small changes in the network, such as at 1-10 samples per second for each system activity occurring at each node in the system. In some implementations the observed data can be stored in the health record 222.

The CDN 221 determines if the observed data represents the normal operation of the monitored networks based on malware rules 223 that instructs the CDN manager 221 on whether the observed data indicates that the network is operating within a normal range based on the sample data. In implementations where the CDN 121 is an authority node 120, the malware rules 223 can exist within the authority node 120. As an example, the malware rules 223 may indicate that the system is operating normally when the observed data falls within a certain range or percentage of an average of sample data for a particular system activity. For instance, if during a sample interval of 10 seconds there are 10 web-site redirections, and during a subsequent observed interval of 10 seconds there are 11 web-site redirections, then the malware rules 223 may indicate that the system is operating under normal conditions. On the other hand, during a subsequent observed interval of 10 seconds there are 20 web-site redirections, then the malware rules 223 may indicate that malicious activity has been detected. Thus, the CDN manager 221 can determine if the observed data represents the normal operation of the monitored networks by comparing the observed data to sample data using one or more malware rules. According to some implementations, the malware rules can identify one or more threshold values representing one or more acceptable values, ranges, or percentages of sample data during the normal operation of the plurality of monitored networks.

According to some implementations, the CDN manager 221 will update the health record 222 only with changes in observed data. For instance, if many system activities do not change during system monitoring, data for those activities are not constantly updated by the CDN manager 221. By updating only changed data the CDN manager 221 minimizes the processing and read/write activities required to maintain the health record 222 and monitor the system 100.

According to some implementations the nodes will not transmit observed data to the CDN 121 when the data is unchanged from a previous interval, or changed by a minimum amount. The CDN 121 can be configured to transmit rules to the nodes instructing each when minimal or no observed data needs to be transmitted to the CDN 121, thus reducing the amount of network traffic required to identify malicious activity. For instance, the CDN 121 can instruct storage nodes not to report observed data for each system activity where the data is within 5% of the previous value of such system activity.

Using the health records 222 and malware rules 223, the CDN manger 221 can detect the status of each node in the system (e.g., live, congested, idle, busy), malicious code outbreaks by observing changes in system activity data (e.g., the number of viruses detected are higher than normal), and virus flow detection. When the observed data indicates that the networks are not operating normally (i.e., within a normal operating range as provided by the sampling data), the CDN 121 can generate an alert. An alert can be communicated to an administrator associated with the system 100 or one or more of the networks, and can be an e-mail, instant message, or the like. An alert can also include corrective action to prevent activity that is causing generation of the data that does not represent the normal operation of the monitored networks.

§3.0 Global System Monitoring

As described above, the distributed system of processing nodes, storage nodes, and authorizing nodes can be coordinated through a CDN 121. The CDN 121 monitors system health at system, region and geographic levels. After sampling data is collected for a large number of system activities across networks, observed data is collected for some or all of those system activities at fine intervals of time. Using the observed data the CDN detects abnormalities in the system, such as virus and spam outbreaks and targeted attack patterns.

A large number of system activities (e.g., in the thousands) can be tracked and monitored at a predefined interval in each of the nodes and their corresponding networks. Data corresponding to a subset (e.g., a few hundred) of these activities are communicated to the CDN 121 for use in monitoring the health of the nodes and identifying the outbreak of virus, spam and other undesirable network traffic in networks connected to the nodes.

§3.0.1 Identifying Abnormal System Activities

Abnormalities in the system are identified by the CDN manager 221 due to a sudden increase in certain system activities, such as an increase in the detection of malware, viruses, spam, bad content, and the like. These malware activities are indicated by a number of system activities collected in the observed data by the CDN 121.

A first system activity are redirects identified within processing nodes at regional, country, and global levels. Observed data can include the number of such redirects. Malware infection can be detected by monitoring the redirection of request to new locations. Although there may be legitimate redirects, the CDN 121 is configured to identify deviation from a 'normal' number of redirects for a certain predefined number of web transactions collected during a sampling interval. Such as deviation can indicate malicious activity and abnormal operation of one or more networks where the redirections occur. For instance, the malware rules 223 within the CDN 121 may indicate that a 25% increase in redirects over a particular time period is indicative of a malware infection (i.e., malware activity).

Another system activity is a policy violation. Observed data can include the number of policy violations occurring within a network. For instance, a policy violation can occur when an employee is accessing a web site that the employee is not supposed to visit due to his or her company's policies. Typically, the number of such policy violations is marginal and consistent. Sudden changes in the number of policy violations can be used as an indicator of malicious activity and can be identified by the CDN 121 through collection of observed data and comparison to the 'normal' number of policy violations during a sampling interval taken during normal operation of the system. The comparison can be executed using malware rules 223 that indicates whether a change in volume provided by a comparison of the observed data and sample data is indicative of a malware infection.

Yet another system activity that can be monitored by the CDN 121 is the operation of malware. Observed data can include the volume of malware detected at each node. According to some implementations, malware can be detected at each node by a virus scan. The CDN 121 can identify sudden increases in malware by comparing the observed volume of malware with sample volume of malware for a same time interval during normal operation of the system. As discussed above, whether an increase in the volume of malware is deemed a malware infection is based on malware rules 223. In some implementations, observed data can also include the direction of malware (upload vs. download) that is detected. The CDN 121 can identify spikes in uploading or downloading of malware. The variation of volume of malware detected in the outbound traffic in proportion to the inbound traffic can also be monitored. For instance, the CDN 121 can identify a malware infection when a sudden increase in outbound traffic occurs with respect to inbound traffic, which could be based on a the attack of many hosts from a single infected host.

Another system activity is the serving of error pages. Observed data including the number of error pages returned may be tracked to identify potential malicious activity. For instance, a spike in the number of observed error pages as compared to the expected number of error pages may be presumed to be the result of malicious activity.

Yet another system activity is the serving of web pages having a particular category. For instance, observed data can include the number of web pages served or accessed having a particular classification, such as 'infected'. A sudden increase in the number of infected web pages served, for instance, may result in the CDN 121 identifying malicious activity. Additionally, sudden changes in the category of sites (detected by the content inspection engines) reported may be indicative of malicious activity.

Observed data for web pages may also include web page classifications based on URL and based on web page content. The malware rules 223 may be configured to deem that an inconsistency in these classifications may be indicative of suspicious activity, and malware rules 223 can indicate that a particular volume of such inconsistencies is indicative of malware activity. Yet additional observed web page related data is a change in the category of top 'N' sites over any period of time. Because malicious activities can 'phone-home' and connect to similar servers, sudden activity resulting in unknown or malware categories of URLs falling within the top 'N' accessed and/or requested sites may be deemed to indicate a malware outbreak. Thus, the identification of possible malware activity may be based on detecting web site abnormalities over time, and/or on the abnormality of website requests over time. Both types of abnormalities are captured by the CDN 121.

§3.0.2 Variations in Observations of Abnormalities

As described above, the CDN 121 uses malware rules 223 to identify if one or more networks within the system are subject to malicious activity. Because malicious activity leads to abnormal statistical records, the malware rules can identify possible malicious activity through a comparison of statistical and observed data. Although described above with respect to example system activities where observed data for a single system activity can result in the presumption of malicious activity, the malware rules 223 may require a cumulative number of instances, over a period of time, in which observed data vary from an expected range, percentage, average, mean (or the like) from sample data.

According to some implementations, abnormalities in observed data identified by the malware rules 223 are counted and tracked as a time series. Three types of abnormalities may be indicative of a malware outbreak. First, a mild increase in a statistical activity followed by a sporadic increase in another statistical activity after a period of time may be indicative of malicious activity. Secondly, multiple sets of abnormal activities spaced in time may indicate malicious activity. An example of this kind occurs when malicious activity is prevented by the security policies which block malicious content. A third type of outbreak pattern occurs when there is a single, sudden peak in a particular activity. This can occur, for instance, where security policies of a company are not strong enough to protect against an attack. When malware is propagated by a chain of activities such as a visit to an infected site, this could cause a malicious program such as a back-door or Trojan to be downloaded which in turn downloads other malicious code which then causes other infected sites to be visited. This pattern could produce progressively increasing peaks in observed data for a particular system activity.

The malware rules 223 can be configured, for instance, by a system administrator, to account for each of the above abnormalities that are based on the receipt of observed data at the CDN 121. As an illustrative example, if malware is detected more than 'X' number of times, such as 50, then an alert can be generated.

§3.0.3 Generation of Alerts

When the observed data falls outside of parameters established by the malware rules 223, the CDN 121 can generate an alert. An alert can be to an administrator associated with the system 100 or one or more of the networks, and can be an e-mail, instant message, or the like. An alert can also include corrective action to prevent activity that is causing generation of the data that does not represent the normal operation of the monitored networks.

§4.0 Example Processes for Secure Content Inspection

The exemplary processes for secure content inspection while avoiding man-in-the-middle attaches may be implemented on the example architecture discussed above or may be stored as a computer program on one or more non-transitory computer readable media as discussed in more detail below. Inspection of secure content without disrupting secure (e.g., SSL) communication's confidentiality and security is highly desirable for cloud based security services. Such approaches should ensure that there are no MitM attacks between the client and the processing node as well as between processing node and server.

Figure 3:
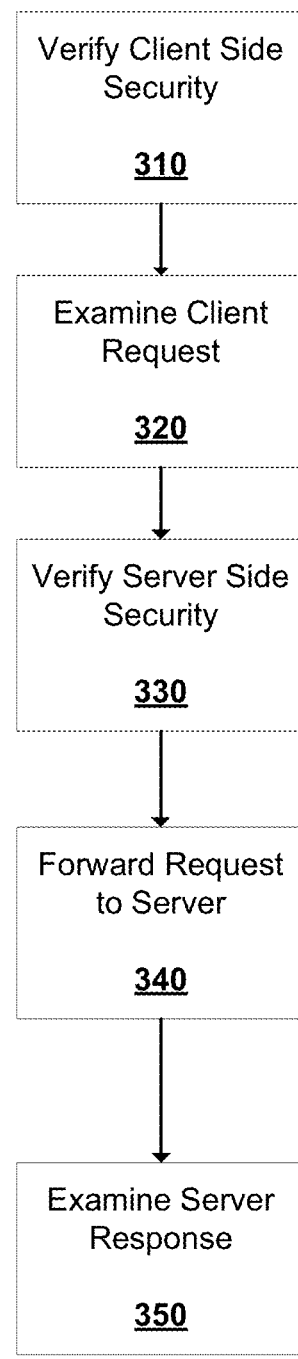
FIG. 3 is a diagram of steps in an exemplary secure content inspection process.

FIG. 3 depicts an exemplary process for secure content inspection while avoiding MitM attacks. A user with a client device uses a cloud based service to access information/services from a server computer. The client device establishes, or has previously established, a connection with the cloud based service. The cloud based service, in step 310, verifies the security of the connection between the client device and the cloud based service, thus ensuring no man-in-the-middle on the client-side of the cloud based service. In some implementations, this verification may include a client certificate authentication such as supported under the secure socket layer (SSL) protocol. In some implementations, the cloud based service may, in step 320, examine the request for information/services from the client device against any policy constraints associated with the user. The cloud base service verifies the security of the connection between the cloud based service and the server, in step 330, thus ensuring no man-in-the-middle on the server-side of the cloud based service. The cloud based service acting on the client device's behalf forwards a request to the server for the desired information/services in step 340. In step 350, the cloud based service may, in some implementations, examine the results of the forward request against any policy constraints associated with the user. The results are then forwarded to the client device by the cloud based service.

In some implementations, the transaction may cease early then completion. For instance, if client-side verification fails, the transaction may conclude. If the cloud based service inspects the client request for information/services and determines that the request is inappropriate, the transaction may conclude. If the server-side verification fails, the transaction may conclude. If the cloud based service inspects the secure content result(s) of the client request and determines that the resul(s) is/are inappropriate, the transaction may conclude. In each of these situations, the user transaction may not end with the requested information/service results displayed at the client device.

In some implementations, the following functional components may be used:

A certificate inspection system that verifies whether a certificate has the desired CA signatories. Such a certificate inspection systems could reside on processing nodes 120 in the exemplary architecture discussed above.

A certificate proxying system that provides a proxy server certificate to the client and a proxy client certificate to the server after proper modification of signatories. Such a certificate proxying system could reside on processing nodes 120 in the exemplary architecture discussed above.

A service database which specifies one or more lists of CAs in the server certificate for one or more network services. Such a service database could reside on processing nodes 120 in the exemplary architecture discussed above. A master service database could, for example, reside on CDN 121 and/or authority nodes 120 where lists of CAs are provided to particular processing nodes 120, and potentially cached by the processing nodes 120, on an as needed.

A list of certificates of trusted CAs. Such a list could reside on processing nodes 120 in the exemplary architecture discussed above. A master list could, for example, reside on CDN 121 and/or authority nodes 120 where the list, or portions thereof, are provided to particular processing nodes 120, and potentially cached by the processing nodes 120, on an as needed.

An SSL module that is available through existing technologies as known to those skilled in the art.

With the use of cloud service for inspection of web content, upon receipt of a request for web content from a client, a cloud service computer (e.g., processing node 120) forwards a "Client Hello" to the server and waits for the sever response per SSL protocol. It buffers all handshake transactions up to and including "Server Hello Done." It inspects whether the server certificate is signed by the list of signatories listed in the service database against the domain. The domain name may be encoded in the common name field of the certificate. If the signatories match, then there is no malicious MitM attack between the server and cloud service computer. If a client certificate request from the server is present, then it is a legitimate client certificate request from the server. If the certificate signatories have been altered, then there may be a MitM. In such instances, the request for web content may be terminated.

In verifying the list of signatories, digital signing and trust forms a transitive closure, the relation A trusts B is a transitive relation. The trust is endorsed through a signature and is presented in a certificate. Together we can say that A certified by B is the combined relation.

Denoting this as an ordered pair (A, B), a certificate will have many such ordered pairs.

(A,B) (B,C) (C,D) . . . (M1, Z1) wherein Z1, M1 are well known signatories, very few in number, and may be country-wide.

In one implementation of the verification, the chain (A,B) (B,C) . . . (M1,Z1) is same as the stored chain.

An alternate implementation computes transitive closure of the chains, counts the ordered pairs, and compares the ordered pairs. The signatory's public key is seen in the certificate using which the certificate can be decrypted.

So, given two ordered pairs (a1, b1) and (a2, b2), they are same if and only if a1=a2 and b1=b2. The equality may be variously described for coverage of particular fields. For example, a1=a2 if a1.publickey==a2.publickey and a1.organizationID==a2.organizationID or a1.publickey==a2.publickey and a1.email=a2.email, etc.

In some implementations, a URL database may be maintained that identifies whether particular domains require client authentication. The buffered handshake actions with the server are used to inspect whether the server has requested for client certificate. In such implementations, if there is a client certificate request received from the server but no requirement for such in the URL database, then there may be a MitM attack between the server and the cloud service computer. The request for web content may be terminated under this circumstance as well.

Even if the server did not ask for a client certificate, the cloud service computer can ask the client for the client certificate signed by the cloud service in order to verify that no MitM attack between the client and cloud service computer is occurring. The standard SSL mechanism to verify the client certificate may be used. The messages from client certificate until "client certificate verify" are received per SSL protocol, and the certificate inspection module checks for the integrity of the certificate. It validates the signatory chain of the certificate. It may also verify the encrypted hash value sent by the client in its "certificate verify" message to see if the client holds the private key of the client certificate. If the certificate is verified satisfactorily, no MitM attack is occurring between the cloud service computer and the client. Either a certificate is generated on the fly which is signed by the cloud service computer or a certificate signed by a designated CA of the service is sent to the server. Normal SSL handshake operations are completed and an encrypted secure communication is established between client and server through the cloud service computer (e.g., processing node 120), allowing the cloud service computer to inspect the traffic per any policy constraints associated with the user.

If a request for web content is terminated prior to completion, a warning may be provided. The warning may be provided to any suitable cloud service administrator, one or more administrators associated with the compromised server, and/or the client.

There are multiple variations that can be applied to the basic theme described above.

The cloud service computer can choose either a single certificate for all the clients or multiple certificates, one certificate each for each client.

The certificate presented to the server by the client may be a certificate issued by cloud service computer or a certificate issued by a CA that the server designated.

Certificates presented by cloud service computer may be either (1) generated on the fly or (2) pre-generated for each client that is subscribed to the cloud based security service and each service that has partnered to receive the authentication and verification through the cloud service computer.

Certificates may be matched for the user-id of the user. The cloud service computer maintains user identity for each user that has authenticated with the cloud service computer such as by means of cookies or credentials. Such user's id may be matched with that of the id present in the cloud service computer issued certificate to the client.

Certificates may be used by the client to log-into the cloud service computer through a secure session. Here both the certificate validity and optionally its canonical name may be matched to authenticate a user. If users are authenticated with the same certificate that is used in service transaction, then the request to present the certificate may be used only intermittently such as at a certain randomly selected time period chosen by the cloud service computer.

Cloud service users, or their organization, can configure its certificate to be shared across users. In such sharing, fewer certificates may be used. The sharing can be at organizational hierarchy, for example, HR, Sales, Marketing, Engineering where each organizational unit shares a single certificate.

The cloud service users can use a single certificate for accessing all services. The single certificate may be signed by the cloud service computer.

Enterprise cloud service subscribers may get a single certificate signed by the cloud service computer for the whole enterprise and use it to sign certificates for individual users of the enterprise. The enterprise may establish its own internal chain of certificate signing authorities.

The cloud service computer may establish a secure channel with a destination server. It uses an appropriate certificate in response to the request from the server. Thus the cloud service computer provides the server with a certificate on the client's behalf that ensures confidentiality of the secure channel. Additionally, the cloud service computer may provide a second factor of authentication, namely the well known IP address of the cloud service computer. In addition, the mere passage of the client certificate indicates that the client has already authenticated with the cloud service and is a valid user. This may be an additional factor in the authentication.

In several of these approaches, the use of aggregated certificates not only simplified the certificate management problem but also provides equal or better strength in the client authentication.

One or more of the implementations of secure content inspection approaches discussed herein may:

1. allow secure inspection of SSL transactions both with and without client certificates.

2. allow detection of MitM and ensures that the communication is free of MitM.

3. optionally allow use of a single certificate to access multiple services securely. The single certificate can be created by the cloud service computer which avoids the complicated process of business verification.

The user is freed from the repeated tasks of generating keys, securing them and getting them signed. As described in the background, the generation of certificate is an involved process. By having a single certificate, the user needs to create only one certificate.

If the certificate holder suspects a leakage of the key or theft, then a single certificate can be revoked to deny access to all secure critical sites. The certificate revocation can be done with the secure services offered by the cloud service If the certificate is presented by another user, then the system can easily detect the fraud, thus saving the user without an explicit revocation. The system can automatically deny the fraudulent user.

The system also potentially allows sharing of certificates across users if it is configured in cloud service computer.
   a. The system administrators are able perform the creation, signing and installation of certificates on behalf of users and only very few certificates need to be created.
   b. Users may be grouped under HR, Sales, Engineering, Marketing, Guests, and allows encoding of privilege roles. The certified privileges may be examined at the policy enforcement nodes (e.g., processing node 120).
   c. Certificates may be configured to expire based on roles. For example, guest certificates may have a small period of life.
   d. The system can reduce the policy instances in the enforcement system by reusing policies and encoding the policy codes in the certificate.
   e. Based on the access mode, for example, inside enterprise, nomadic access, home access, the system can request for a certificate of a specified role.

Since the client certificate may be signed by the cloud service computer with no certificate chain leading to a root CA, the certificate is need not be valid outside the security gateway. Hence the stolen certificate cannot be used outside of the secure perimeter. Thus a stolen certificate is of no value outside the security perimeter.

Under security breaches, multiple certificates are to be revoked, one belonging to each service. But with cloud based services, revocation of certificates need not involve multiple CAs, hence a single operation may be sufficient.

Since there is no external CRL (Certificate Revocation List) to be inspected and no OCSP (Online Certificate Status Protocol) messages to be sent, the verification complexity may be reduced. In some instances, the options of CRL and OCSP may be turned-off in the client.

A stolen client certificate cannot be used to obtain the corresponding certificate that cloud service computer presents to the security services.

Client certificates may be issued with varying expiration dates to suit the needs of the enterprise workforce. Since revocation is local, management of such certificates is easy.

4. use a single certificate per service to reduce the number of certificates that the service has to validate.

Instead of using individual user's IP address, the service validates the source of the certificate as one of the cloud service computer's address. By configuring the cloud service computer IPs, the servers need to manage only a small number of IP addresses for source validation.

Validation can be done even from nomadic access.

Validating IPs may be restricted to have access only from certain geographic region.

Overall security is improved through the use of cloud service computer authentication credentials (2-factor authenticated), client certificate, security service login credentials, IP address of the cloud service computer.

Instead of one certificate per service, a small number of certificates, one per geographic region may be presented to the service sites, so that service sites can choose to deny/allow access based on the country of origin.

5. use half-way encryption by requiring the encryption of exchanges between itself and the client.

The security of the data communicated to cloud service computer (e.g., processing node 120) is ensured and is equivalent to the level of security offered by on premise appliances. The channel between client and the cloud service computer is isolated from other channels and is secured. The cloud service computer can enforce the use of HTTPS even when the target domain service is in clear text and require the production of a client certificate.

The cloud service computer can request to produce role based certificates to ensure the access privileges of the user based on the current mode of use (Eg. Inside the enterprise, At home, Nomadic access).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a non-transitory computer readable medium. The computer readable medium can be a machine readable storage device, a machine readable storage substrate, a memory device (volatile or non volatile), or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of volatile or non volatile memory, media and memory devices, including by way of example semiconductor memory devices, e.g., EPROM, EEPROM, RAM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. Other embodiments of the invention will be apparent to those skilled in the art from their consideration of the specification and practice of the invention disclosed in this document. The applicant intends that the specification and examples be considered as exemplary only, with the true scope and spirit of the invention being indicated by the following claims.

What is claimed is:

1. A method performed by a cloud security computer to avoid a man-in-the-middle attack, comprising the steps of:
    A) receiving an inbound request from a client computer at a cloud security computer that is part of a cloud based security system located in a network external from the client computer and in a network external from a destination of the inbound request;
    B) performing a client certificate verification with the client computer;
    C) if the client computer passes the client certificate verification,
        i) receiving a server certificate from a server computer determined from the inbound request;
        ii) verifying the server certificate, wherein verifying the server certificate comprises determining whether a chain of authority associated with the server certificate received is consistent with a reference chain of authority determined from the inbound request, wherein the chain of authority comprises a plurality of authorities; and
        iii) if the server certificate is verified,
            a) forwarding a request derived from the inbound request to the server;
            b) receiving results from the server; and
            c) forwarding the results to the client computer;
    D) if the client certificate verification fails or the server certificate is not verified, concluding a transaction between the client computer and the server; and
    E) examining data between the client computer and the server computer for compliance with one or more policy constraints, wherein the one or more policy constraints relate to malicious activity identified by a configuration distribution node coordinating activity in the cloud based security system;
    wherein the cloud security computer inspects secure content over secure socket layer while avoiding detection of a man-in-the-middle attack therein based on steps A)-E).

2. The method of claim 1, wherein the client computer is associated with a user identifier, and further comprising the step of examining the inbound request for compliance with the one or more policy constraints associated with the user identifier.

3. The method of claim 1, wherein the client computer is associated with a user identifier, and further comprising the step of examining results for compliance with the one or more policy constraints associated with the user identifier.

4. The method of claim 1, and further comprising the steps of buffering actions in a handshake with the server, looking up a client authentication policy associated with the server, and comparing the client authentication policy with the actions in the handshake.

5. The method of claim 1, and further comprising the steps of signing a client certificate associated with the client computer and forwarding the signed client certificate to the client, and wherein the client certificate verification uses the signed client certificate.

6. The method of claim 1, and further comprising the steps of receiving a signed client certificate from the server and forwarding the signed client certificate to the server in response to a request from the server for a client certificate.

7. The method of claim 1, wherein the configuration distribution node receives data corresponding to system activity from multiple networks during normal operation of the networks to identify the malicious activity via abnormalities in the networks.

8. The method of claim 5, wherein a same certificate for the client certificate is utilized by the cloud based security system for a plurality of users comprising the client computer.

9. The method of claim 1, further comprising providing a second factor of authentication to the server comprising an Internet Protocol (IP) address of a cloud service computer of the cloud based security system.

10. A system, comprising:
a node communicatively coupled to a network, wherein the node is part of a cloud based security system;
a client communicatively coupled to the node via the network, wherein the client is located externally from the cloud based security system; wherein the node is configured to:
A) receive an inbound request from the client;
B) perform a client certificate verification with the client;
C) if the client passes the client certificate verification,
  i) receive a server certificate from a server computer determined from the inbound request, the server computer is located externally from the cloud based security system;
  ii) verify the server certificate comprising determining whether a chain of authority associated with the server certificate received is consistent with a reference chain of authority determined from the inbound request, wherein the chain of authority comprises a plurality of authorities; and
  iii) if the server certificate is verified,
    a) forward a request derived from the inbound request to the server;
    b) receive results from the server; and
    c) forward the results to the client;
D) if the client certificate verification fails or the server certificate is not verified, conclude a transaction between the client computer and the server; and
E) examine data between the client computer and the server computer for compliance with one or more policy constraints, wherein the one or more policy constraints relate to malicious activity identified by a configuration distribution node coordinating activity in the cloud based security system;
wherein the node inspects secure content over secure socket layer while avoiding detection of a man-in-the-middle attack therein based on steps A)-E).

11. The system of claim 10, wherein the client is associated with a user identifier, and the node is further configured to examine the inbound request for compliance with the one or more policy constraints associated with the user identifier.

12. The system of claim 10, wherein the client is associated with a user identifier, and the node is further configured to examine results for compliance with the one or more policy constraints associated with the user identifier.

13. The system of claim 10, wherein the node is further configured to buffer actions in a handshake with the server, look up a client authentication policy associated with the server, and compare the client authentication policy with the actions in the handshake.

14. The system of claim 10, wherein the node is further configured to sign a client certificate associated with the client and forward the signed client certificate to the client, and wherein the client certificate verification uses the signed client certificate.

15. The system of claim 10, wherein the node is further configured to receive a signed client certificate from the server and forwarding the signed client certificate to the server in response to a request from the server for a client certificate.

16. The system of claim 10, wherein the configuration distribution node receives data corresponding to system activity from multiple networks during normal operation of the networks to identify the malicious activity via abnormalities in the networks.

17. The system of claim 14, wherein a same certificate for the client certificate is utilized by the cloud based security system for a plurality of users comprising the client computer.

18. The system of claim 10, wherein the node is further configured to provide a second factor of authentication to the server comprising an Internet Protocol (IP) address of the node of the cloud based security system.

* * * * *